April 18, 1961  R. M. KROKOS ET AL  2,980,442
HITCH ASSEMBLY
Filed Jan. 2, 1958  2 Sheets-Sheet 1
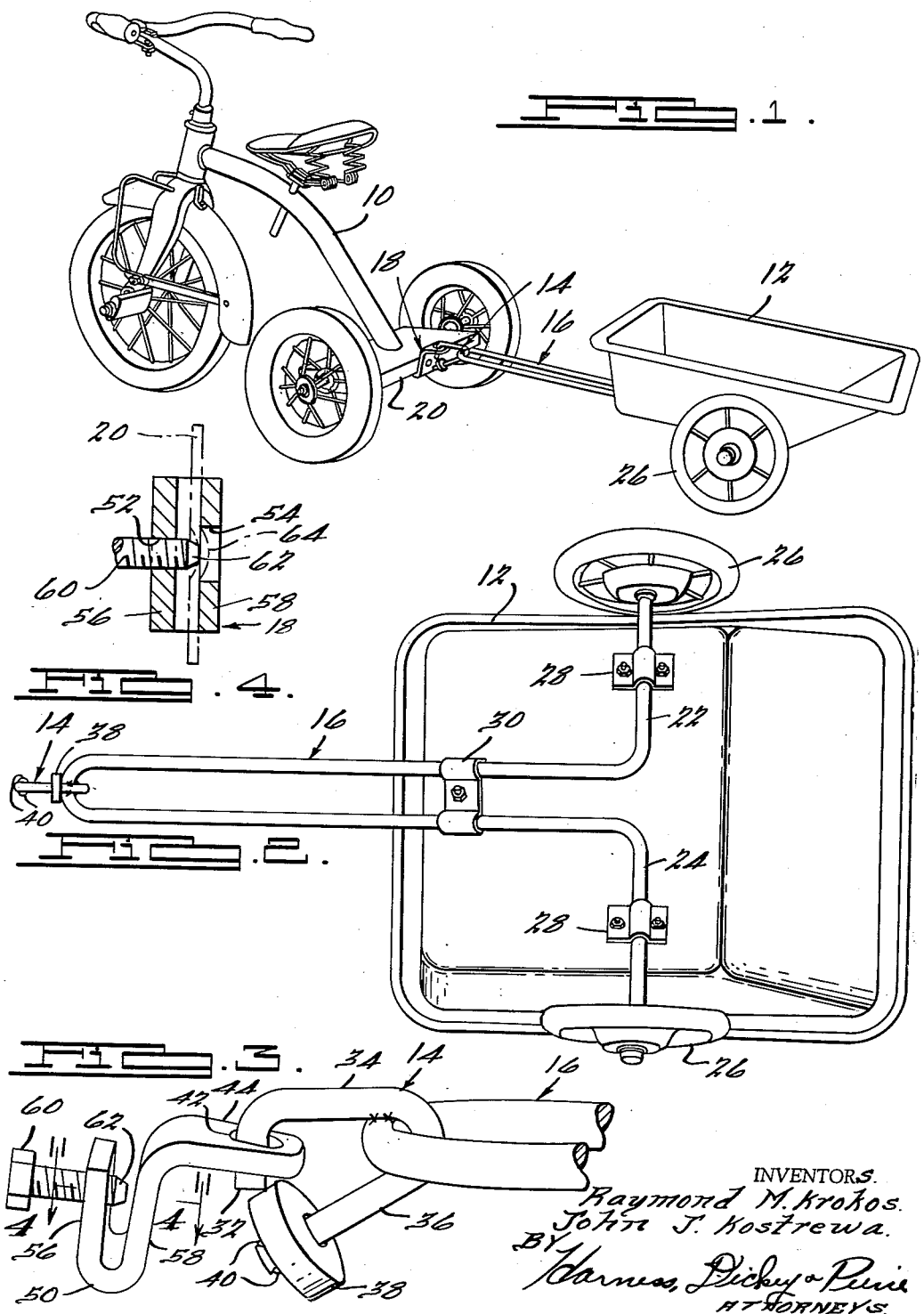
INVENTORS.
Raymond M. Krokos.
John J. Kostrewa.
BY
Harness, Dickey & Pierce
ATTORNEYS.

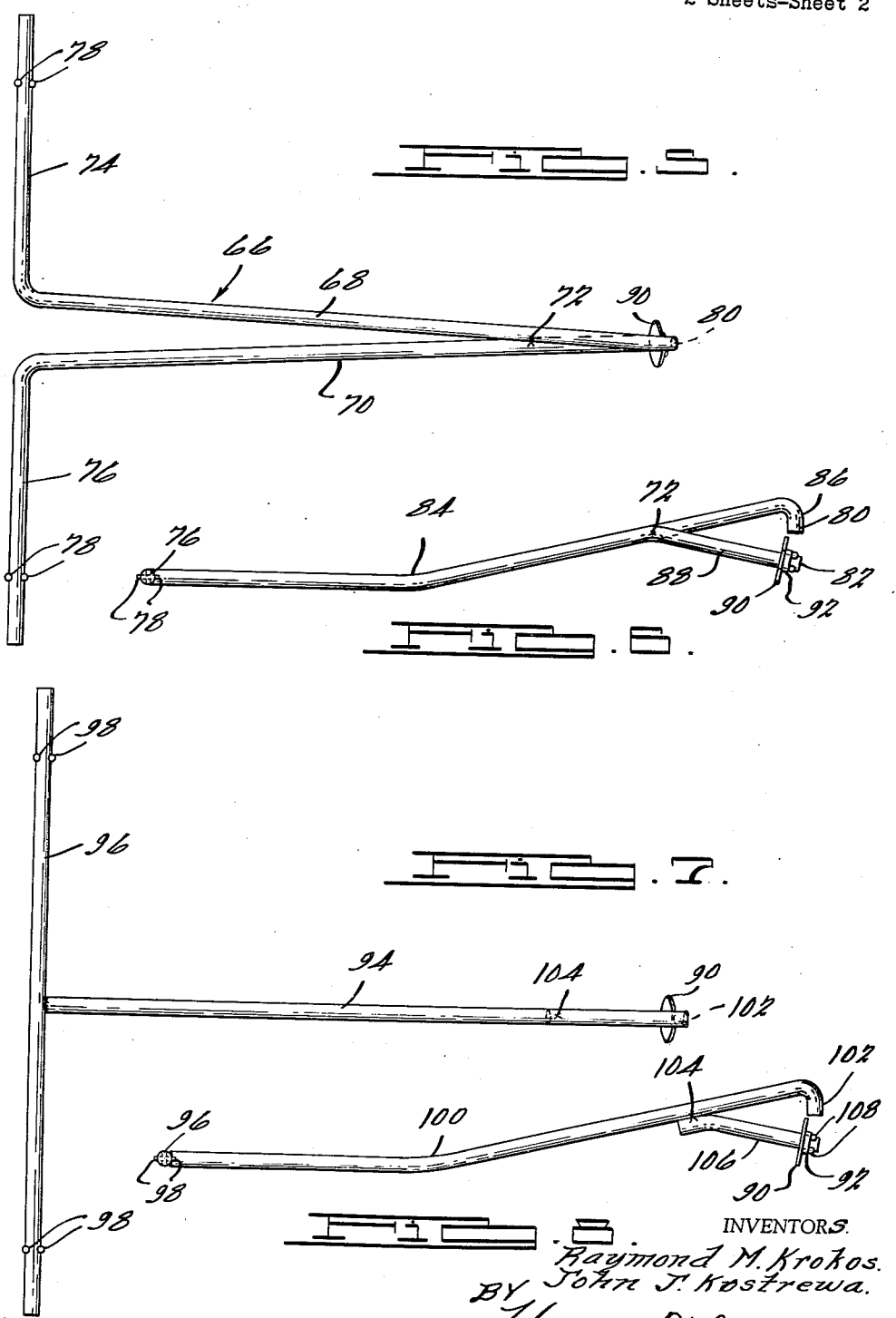

United States Patent Office 2,980,442
Patented Apr. 18, 1961

2,980,442

HITCH ASSEMBLY

Raymond M. Krokos and John J. Kostrewa, Detroit, Mich., assignors to Evans Products Company, Plymouth, Mich., a corporation of Delaware Filed Jan. 2, 1958, Ser. No. 706,749

12 Claims. (Cl. 280—204)

This invention relates to hitch assemblies for fastening trailers to velocipedes and particularly to a unit tongue and axle for a trailer having a catch on the end thereof adapted to releasably engage the rear of a velocipede.

It is one object of the invention to provide a hitch assembly for connecting a trailer to a velocipede which can be easily operated and which is maintained in locking position by the force of gravity.

It is another object of the invention to provide a unit tongue and axle for a trailer having a catch on the end of the tongue adapted to releasably engage a bracket on the rear of a velocipede.

It is a further object of the invention to provide a tongue and axle for a trailer that is made from two pieces of metal rod joined together adjacent the end forming the tongue with said end having a catch formed thereon for engaging a bracket on the rear of a velocipede.

It is a still further object of the invention to provide a catch mounted on the end of the tongue of a trailer adapted to releasably engage the rear of a velocipede and having a member slidably mounted thereon which can be moved to two positions on the catch, one of said positions preventing the disengagement of the catch from the velocipede, and the other of the positions permitting the disengagement of the catch from the velocipede.

It is a still further object of the invention to provide a bracket which can be releasably mounted on the rear of a velocipede in a positive manner to enable a trailer to be connected to the velocipede.

It is a still further object of the invention to provide a tongue, axle, catch and bracket for connecting a trailer to the rear of a velocipede which is relatively inexpensive to manufacture, rugged in construction, and extremely simple to operate.

Other objects and features of novelty of the invention will be specifically pointed out or otherwise become apparent when referring, for a better understanding of the invention, to the following description taken in conjunction with the accompanying drawings, wherein:

Figure 1 is a perspective view of a velocipede having a trailer connected to the rear thereof in accordance with the present invention;

Fig. 2 is an enlarged view of the underside of the trailer of Fig. 1 illustrating a unit tongue and axle embodying features of the invention;

Fig. 3 is an enlarged broken view of the bracket and catch illustrated in Fig. 1 for connecting the tongue of the trailer to the velocipede;

Fig. 4 is a sectional view of the structure illustrated in Fig. 3, taken along the line 4—4 thereof;

Fig. 5 is a plan view of a tongue and axle for a trailer illustrating another form of the invention;

Fig. 6 is an elevational view of the structure illustrated in Fig. 5;

Fig. 7 is a plan view of a tongue and axle for a trailer illustrating still another form of the invention; and Fig. 8 is an elevational view of the structure illustrated in Fig. 7.

Referring to Fig. 1, a velocipede 10 is illustrated having a trailer 12 connected to the rear thereof in accordance with the present invention by a catch 14 on the end of a tongue 16. The catch 14 releasably engages a bracket 18 mounted on a vertically extending rear flange 20 on the rear of the velocipede 10.

Referring to Fig. 2, the tongue 16 is formed from one piece of metal rod bent into an elongated U-shape with the ends thereof bent laterally outwardly to form axle portions 22 and 24 for wheels 26 of the trailer 12. Brackets 28 and 30 are fitted over the axle portions 22 and 24 and the tongue portion 16, and are bolted or otherwise secured to the underside of the trailer 12 to mount the tongue and axle portions thereon. By forming the tongue and axle portions from one piece of metal rod, a simple, rugged construction is provided which is relatively inexpensive to manufacture.

As most clearly illustrated in Fig. 3, the catch 14 is welded or otherwise rigidly mounted on the end of the tongue 16 and is formed from a metal rod having a vertically extending end portion 32, a horizontal intermediate portion 34 and a downwardly sloping portion 36. A disk shaped member 38 is slidably disposed on the sloping portion 36 and is retained thereon by projections 40 which are upset on the end of the sloping portion.

It will be observed that the vertical portion 32 is adapted to project through an aperture 42 in a horizontally extending portion 44 of the bracket 18. Since the member 38 is slidably disposed on the downwardly sloping portion 36, it will be urged by gravity to a position beneath the vertical portion 32 to prevent its disengagement from the horizontal portion 44 of the bracket.

The position of the projections 40 will determine the locking position of the member 38 relative to the vertical portion 32, and it is apparent that as long as the projections permit the member 38 to slide beneath the horizontal portion 44 of the bracket, the member will prevent the removal of the vertical portion from the bracket. Of course, the projections 40 must be formed after the member 38 is positioned on the sloping portion 36, however, if desired, the projections can be eliminated and the member 38 retained by permitting it to abut against the lower end of the vertical portion 32. This can be readily accomplished by bending the sloping portion 36 into final position after the member 38 has been positioned thereon.

In addition to the horizontal portion 44 the bracket 18 has a U-shaped portion 50 with legs 56 and 58 having aligned apertures 52 and 54 therein, as most clearly illustrated in Fig. 4. The aperture 52 is threaded to receive a bolt 60 having a frusto-conical end 62 so that when the legs of the U-shaped portion 50 are disposed over the flange 20, as illustrated in Fig. 1, the bolt 60 can be turned inwardly to crimp the portion of the flange 20 adjacent thereto into the aligned aperture 54 to securely mount the bracket 18 on the rear of the velocipede 10. The flange 30 is illustrated in dotted and dashed lines in Fig. 4 with a portion 64 thereof crimped as described.

Referring to Figs. 5 and 6 another form of the invention is illustrated wherein a tongue axle and catch 66 is formed from two metal rods 68 and 70 welded together at a point 72 spaced from the end thereof to form a tongue for the trailer. The other end of the rods 68 and 70 are bent laterally outwardly to form axle portions 74 and 76 with projections 78 upset thereon to facilitate the positioning of wheels on the axle portions. The tongue and axle 66 would, of course, be mounted on the underside of the trailer in substantially the same manner as the unit tongue and axle illustrated in Fig. 2.

It will be observed that the portions of metal rods 68 and 70 forming the tongue are disposed at a slight angle to one another, as viewed in Fig. 5, so that ends 80 and 82 are disposed one above the other. It will also be observed that the rods 68 and 70 are bent upwardly as at 84 so that the trailer may be disposed in a horizontal manner when the tongue is connected to the bracket 18 on the rear of the velocipede 10.

The end 80 of the rod 66 is bent downwardly to provide a substantially vertically extending portion 86, and the end 82 of the rod 70 is bent downwardly from the welded point 72 to provide a sloping portion 88 which is oriented relative to the end 80 similar to the manner in which the sloping portion 36 is oriented relative to the vertical portion 32 of Fig. 3. A washer like member 90 having a boss portion 92 projecting therefrom is slidably disposed on the sloping portion 88 and serves substantially the same function as the disk like member 38 of Fig. 3. However, the washer like portion 90 and boss portion 92 may be stamped as an integral unit from sheet metal.

Referring to Figs. 7 and 8 still another form of the invention is illustrated wherein a tongue 94 is formed by welding or otherwise securing a metal rod to a second metal rod 96 forming an axle for the trailer. As previously described, projections 98 are upset on the axle 96 to facilitate the positioning of the wheels of the trailer. The tongue 94 is also bent upwardly as at 100 similar to the manner in which the metal rods 68 and 70 of Figs. 5 and 6 were bent upwardly, and the end of the tongue is bent downwardly to provide a substantially vertical portion 102.

A relatively short length of metal rod is welded to the tongue 100 as at 104 and bent downwardly to provide a sloping portion 106, and the washer like member 90 with the boss portion 92 is slidably disposed on the sloping portion 106 as previously described. Projections 108 are upset on the end of the sloping portion 106 to limit the sliding movement of the washer like portion 90. Thus, by simply adding a relatively short metal rod to the end of the tongue 100 a catch is formed on the end of the tongue which is similar to, and functions in the same manner as, the catch formed on the ends of the metal rods 68 and 70 illustrated in Figs. 5 and 6 and also the catch illustrated in Fig. 3.

Either of the three described forms of the catch provide a relatively simple and inexpensive construction for connecting the tongue of a trailer to the bracket 18 which is adapted to be mounted on the rear of the velocipede in an effective, yet simple manner. The over-all combination of the tongue, catch and bracket provides a hitch assembly that is extremely well suited for connecting a trailer to a juvenile velocipede, since the entire assembly is relatively inexpensive, positive in its connection, and can be easily operated by a child.

What is claimed is:

1. A unit tongue, axle and catch for connecting a trailer to a velocipede comprising two members joined together at a point adjacent to and spaced from corresponding ends thereof with the other ends thereof bent to form axle portions for said trailer, one of said corresponding ends having a substantially vertical portion adapted to engage the rear of said velocipede, the other of said corresponding ends sloping downwardly from said point to an acute angle to said one of said ends to a position beneath and spaced from said vertical portion, and locking means slidably disposed on the other of said ends for releasably retaining said vertical portion in engagement with the velocipede.

2. A unit tongue, axle and catch for connecting a trailer to a velocipede comprising two members joined together at a point adjacent to and spaced from corresponding ends thereof with the other ends thereof bent to form axle portions for said trailer, one of said corresponding ends having a substantially vertical portion adapted to engage the rear of the velocipede, the other of said corresponding ends sloping downwardly from said point to an acute angle to said one of said ends to a position beneath and spaced from said vertical portion, and a member slidably disposed on the other of said ends and adapted to be urged by gravity to a position beneath said vertical portion to releasably maintain it in engagement with the velocipede.

3. A unit tongue axle and catch for connecting a trailer to a velocipede comprising two rods joined together at a point adjacent to and spaced from corresponding ends thereof with the other ends thereof bent to form axle portions for said trailer, one of said corresponding ends having a substantially vertical portion adapted to engage the rear of the velocipede, the other of said corresponding ends sloping downwardly from said point at an acute angle to said one of said ends to a position beneath and spaced from said vertical portion, and a member having a washer-like portion and a projecting boss portion slidably disposed on the other of said ends and adapted to be urged by gravity to a position beneath said vertical portion to releasably maintain it in engagement with the velocipede.

4. A unit tongue and catch for connecting a trailer to a velocipede comprising a tongue member adapted to be attached to and extending from said trailer, the end of said tongue having a substantially vertical portion adapted to engage the rear of said velocipede, a relatively short member extending downwardly from a point adjacent to and spaced from the end of said tongue member at an acute angle relative to said vertical portion to a position beneath and spaced from said vertical portion, and locking means slidably disposed on said relatively short member and urged therealong by gravity for releasably retaining the vertical portion in engagement with the velocipede.

5. A unit tongue and catch for connecting a trailer to a velocipede comprising a relatively short member fastened adjacent to and spaced from the end of said tongue and sloping downwardly therefrom to an acute angle relative thereto, the end of said tongue being bent downwardly to a point above and spaced from the end of said member and adapted to engage the rear of said velocipede, and a member slidably disposed on said relatively short member and adapted to be urged by gravity to a position beneath said vertical portion to releasably maintain it in engagement with the velocipede.

6. A unit tongue and catch for connecting a trailer to a velocipede comprising a relatively short rod fastened adjacent to and spaced from the end of said tongue and sloping downwardly therefrom at an acute angle relative thereto, the end of said tongue being bent downwardly to a point above and spaced from the end of said rod and adapted to engage the rear of said velocipede, and a member having a washer-like portion and a projecting boss portion slidably disposed on said relatively short member and adapted to be urged by gravity to a position beneath said vertical portion to releasably maintain it in engagement with the velocipede.

7. A hitch assembly for connecting the tongue of a trailer to a velocipede comprising a catch on the end of said tongue, said catch having a generally vertical end portion, an intermediate portion and a portion sloping downwardly at an acute angle to said end portion to a predetermined point beneath and spaced from said end portion, said end portion being adapted to engage the rear of said velocipede, a member slidably disposed on said sloping portion and adapted to be urged by gravity to a position beneath said end portion to prevent its disengagement from the velocipede.

8. A hitch assembly for connecting the tongue of a trailer to a velocipede comprising a catch on the end of said tongue, said catch having a generally vertical end portion, an intermediate portion and a portion sloping downwardly at an acute angle to said end portion to a point beneath and spaced from said end portion, said end portion being adapted to extend through an aperture in a flange projecting generally horizontally from the rear of said velocipede, and a member having a washer-like portion and a projecting boss portion slidably disposed on the sloping portion and adapted to be urged by gravity to a position beneath said end portion to prevent its disengagement from the velocipede.

9. A hitch assembly for attaching the tongue of a trailer to a velocipede comprising a bracket adapted to be mounted on a rear flange of said velocipede, said bracket comprising a U-shaped portion adapted to be dispoesd over said flange with a generally horizontal portion having an aperture therein projecting rearwardly from one of the legs of said U-shaped portion, the legs of said U-shaped portion having aligned apertures therein with one of said apertures being threaded, a bolt screwed into the threaded aperture and adapted to crimp the adjacent portion of the flange into the other of said aligned apertures to secure the bracket to the velocipede, a catch on the end of said tongue having a generally vertical end portion adapted to extend through said aperture, an intermediate portion and a portion sloping downwardly at an acuate angle to said end portion to a point beneath and spaced from said vertical end portion, and locking means slidably disposed on the sloping portion for releasably retaining said end portion within said aperture.

10. A hitch assembly for attaching the tongue of a trailer to a velocipede comprising a bracket adapted to be mounted on a rear flange of said velocipede, said bracket comprising a U-shaped portion adapted to be disposed over said flange with a generally horizontal portion having an aperture therein projecting rearwardly from one of the legs of said U-shaped portion, the legs of said U-shaped portion having aligned apertures therein with one of said apertures being threaded, a bolt screwed into the threaded aperture having a shaped end adapted to crimp the portion of the flange adjacent thereto into the other of said aligned apertures to secure the bracket to the velocipede, a catch on the end of said tongue having a generally vertical end portion adapted to extend through said aperture, an intermediate portion and a portion sloping downwardly at an acute angle to said end portion to a point beneath and spaced from said end portion, a member slidably disposed on said sloping portion and adapted to be urged by gravity to a position beneath said vertical end portion to prevent its removal from said aperture.

11. A hitch assembly for attaching the tongue of a trailer to a velocipede comprising a bracket adapted to be mounted on a rear flange of said velocipede, said bracket comprising a U-shaped portion adapted to be disposed over said flange with a generally horizontal portion having an aperture therein projecting rearwardly from one of the legs of said U-shaped portion, the legs of said U-shaped portion having aligned apertures therein with one of said apertures being threaded, a bolt screwed into the threaded aperture and having the end thereof adapted to crimp the portion of the flange adjacent thereto into the other of said aligned apertures to secure the bracket to the velocipede, a catch on the end of said tongue having a generally vertical end portion adapted to extend through said aperture, an intermediate portion and a portion sloping downwardly at an acute angle to said end portion to a point beneath and spaced from said end portion, and a member having a washer like portion and a projecting boss portion slidably disposed on the sloping portion and adapted to be urged by gravity to a position beneath said end portion to prevent its removal from said aperture, the end of said sloping portion being distorted to limit the sliding movement of said member.

12. A readily disengageable connection between two members comprising a first part having a horizontally extending flange with an opening in the flange, said first part being securable to one of the members, a second part securable to the other of the members having a downwardly and vertically extending projection adapted to fit in said opening, said second part having a downwardly inclined portion extending at an acute angle to the horizontal and terminating adjacent the bottom of said projection, and a disc slidable on said inclined portion and biased by gravity to a position adjacent the end thereof, said disc being disposed beneath said flange when in said gravity biased position.

References Cited in the file of this patent

UNITED STATES PATENTS

| | | |
|---|---|---|
| 1,886,726 | Pennefeather | Nov. 8, 1932 |
| 2,181,413 | Anderson | Nov. 28, 1939 |
| 2,283,436 | Hawkins | May 19, 1942 |
| 2,343,109 | Neal | Feb. 29, 1944 |
| 2,392,368 | Dilbert | Jan. 8, 1946 |
| 2,475,177 | Chovan | July 5, 1949 |
| 2,507,855 | Drew | May 16, 1950 |
| 2,557,147 | Schatzman | June 19, 1951 |
| 2,802,673 | Hazlett | Aug. 13, 1957 |
| 2,835,510 | Schoeneberg | May 20, 1958 |

FOREIGN PATENTS

| | | |
|---|---|---|
| 310,143 | Italy | July 29, 1933 |